United States Patent [19]
Arai

[11] 3,832,075
[45] Aug. 27, 1974

[54] MECHANICAL CONNECTING DEVICE
[76] Inventor: Akira Arai, 76, 2 chome, Soshigaya Setagaya-ku, Tokyo, Japan
[22] Filed: July 25, 1972
[21] Appl. No.: 275,030

[30] Foreign Application Priority Data
July 27, 1971 Japan.............................. 46-66642
Aug. 5, 1971 Japan.............................. 46-70016

[52] U.S. Cl.................... 403/328, 403/14, 403/377
[51] Int. Cl............................................. F16b 21/09
[58] Field of Search.... 287/DIG. 9, DIG. 13, 119 R, 287/119 L; 285/7, 321, DIG. 8, DIG. 22, 317, 27; 279/79; 24/215; 85/8.8; 292/91, 320, 321; 339/69, 70, 75 R, 75 T, 91 R, 91 L, 128; 248/223, 342, 343

[56] References Cited
UNITED STATES PATENTS

| | | | |
|---|---|---|---|
| 788,488 | 4/1905 | Miller............................ | 287/119 R |
| 1,280,244 | 10/1918 | Kroedel........................... | 403/327 |
| 1,305,233 | 5/1919 | Ogden............................. | 24/215 |
| 1,572,142 | 2/1926 | Hood.............................. | 287/119 R |
| 1,834,909 | 12/1931 | Wilson............................ | 306/28 |
| 1,873,191 | 8/1932 | Fabrey............................ | 285/319 |
| 2,194,386 | 3/1940 | Dunaway......................... | 287/119 R |
| 2,245,151 | 6/1941 | Martinet......................... | 280/7 |
| 2,835,517 | 5/1958 | Beerli............................. | 403/328 |
| 3,467,476 | 9/1969 | Konig............................. | 403/326 |
| 3,679,244 | 7/1972 | Reddy............................. | 403/328 |

*Primary Examiner*—Jordan Franklin
*Assistant Examiner*—Conrad L. Berman
*Attorney, Agent, or Firm*—Wolder & Gross

[57] ABSTRACT

A separable coupling includes a female coupling member having a first circular peripheral wall provided with circumferentially spaced coplanar first slots and cam faces leading radially inwardly from the outer edge of the peripheral wall towards respective slots. A male coupling member has a second circular wall which slideably telescopes the first peripheral wall and has slots registering with the first slots. A locking member formed of resilient wire is located in the male coupling member and has integrally formed outwardly directed ears with outwardly converging side edges engaging corresponding pairs of registering slots. The peripheral walls may be conical or cylindrical and may be continuous or interrupted along their lengths. In joining the coupling members they are axially brought together with the cam faces contracting the ears until they register with and expand in the slots and by twisting one of the members relative to the other the ears are contracted out of the female slot permitting uncoupling.

4 Claims, 6 Drawing Figures

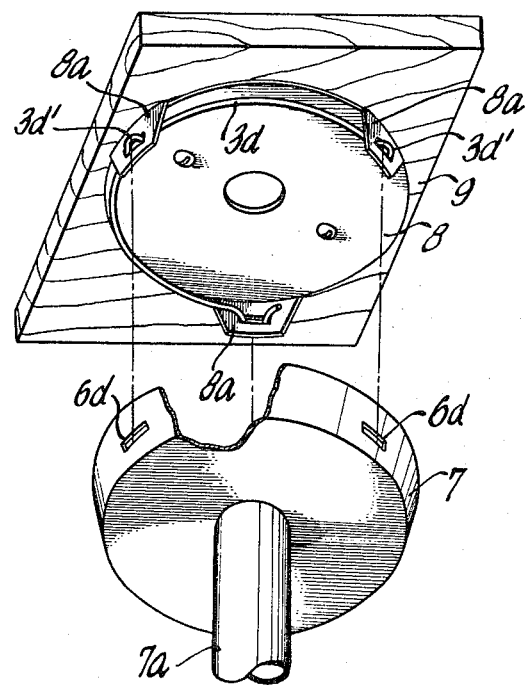
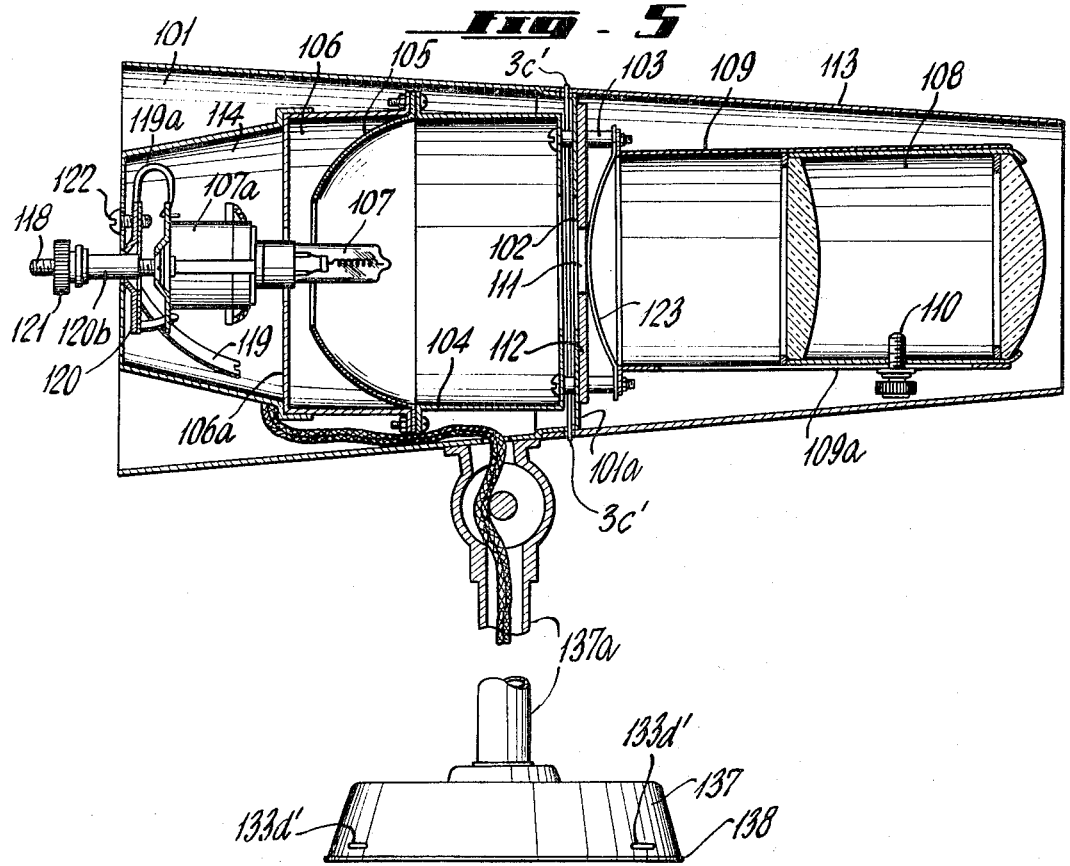

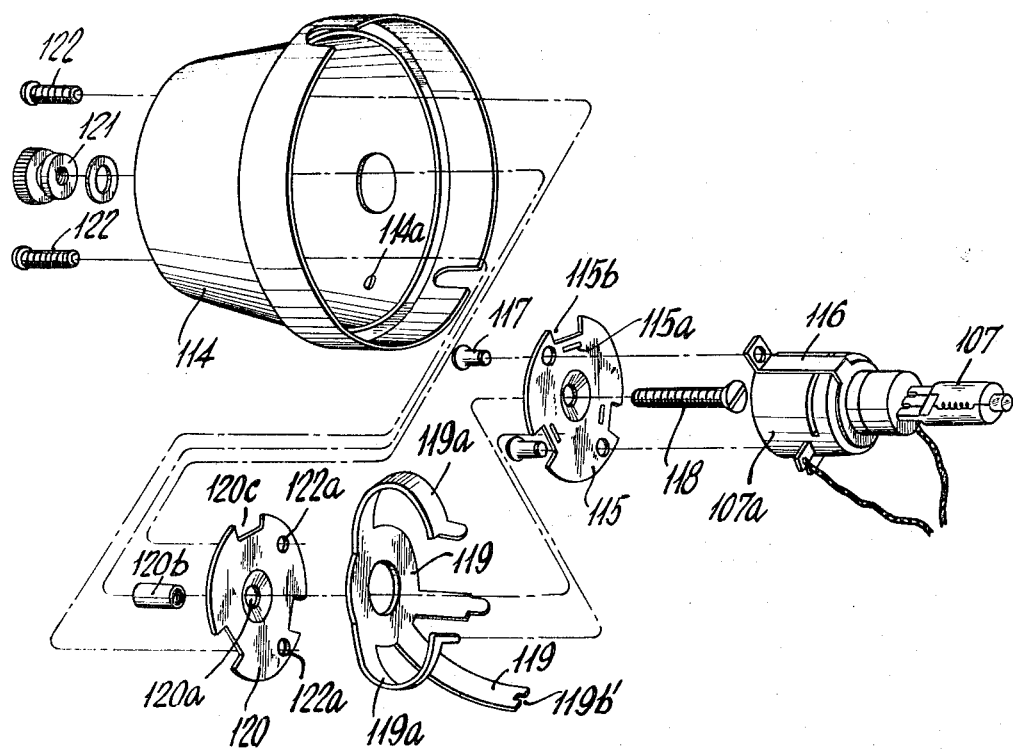

MECHANICAL CONNECTING DEVICE

BACKGROUND OF THE INVENTION

The present invention relates generally to improvements in mechanical connectors and it relates particularly to an improved separable coupling.

It is frequently desirable to interconnect the components of various devices by coupling means which permits the rapid firm assembly and disassembly of a pair of components without the use of tools. Among the devices frequently requiring such separable coupling means are for example, toys, lighting fixtures, various appliances and the like. The separable coupling means heretofore available or proposed possess numerous drawbacks and disadvantages. They are generally awkward arrangements of low reliability and often complicated and expensive, of little versatility and otherwise leave much to be desired.

SUMMARY OF THE INVENTION

It is a principal object of the present invention to provide an improved mechanical connecting device.

Another object of the present invention is to provide an improved separable coupling.

Still another object of the present invention is to provide an improved mechanical separable coupling which may be easily operated without the use of tools.

A further object of the present invention is to provide a separable coupling of the above nature characterized, by its reliability, simplicity, ruggedness, ease of operation, low cost and great versatility.

The above and other objects of the present invention will become apparent from a reading of the following description taken in conjunction with the accompanying drawings which illustrate preferred embodiments thereof.

In a sense the present invention contemplates the provision of a separable coupling comprising a female coupling member including a first peripheral wall having a plurality of circumferentially spaced recesses accessible at the inner face of the peripheral wall and cam defining faces tapered radially outwardly in a direction from each of the recesses toward the outer edge of the wall, a male coupling member having a circular second peripheral wall at least partially telescoping the first peripheral wall and having peripherally spaced openings registering with corresponding recesses, and an elongated resilient member disposed in the male coupling member and having outwardly directed ears resiliently biased outwardly under the influence of the resilient member through respective of the openings and into engagement with the recesses when the coupling members are in coupled condition.

The peripheral walls of the coupling members may be of conical or cylindrical shape and continuous or interrupted along their circumferences. The recesses and openings are advantageously circumferential slots and the locking member is formed of spring wire with the ears having outwardly converging sides. Cam faces are formed on the inside surfaces of the female coupling member peripheral wall, the cam faces flaring outwardly toward the wall outer edge. In the fully extended condition of the ears, the distance of the ends of the ears from the center of coupling member is less than that of the outer edges of the cam faces. Where the peripheral walls are conical the inside surface of the female coupling member defines the cam faces.

The improved coupling is simply rugged, highly reliable and of great versatility.

BRIEF DESCRIPTION OF THE DRAWINGS

FIG. 4 is a bottom perspective view, partially broken away, of a further embodiment of the present invention shown in a separated condition;

FIG. 5 is a longitudinal sectional view of an adjustable lamp employing the coupling of the present invention; and FIG. 6 is an exploded perspective view of a part thereof.

DESCRIPTION OF THE PREFERRED EMBODIMENTS

Figure 1:
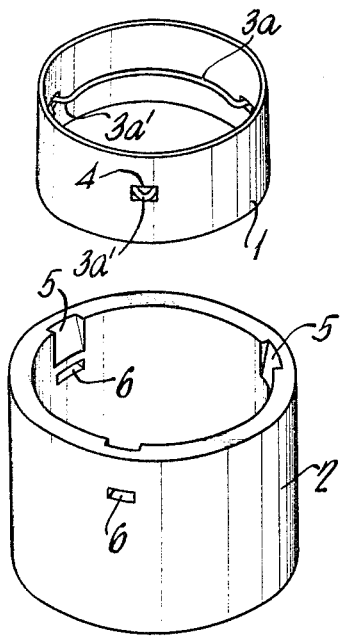
FIG. 1 is a front perspective view of a coupling embodying the present invention illustrated in a separated condition.

Referring to FIG. 1 which shows a preferred embodiment of the present invention for separably coupling two separate male and female coupling member which respectively include cylinders 1 and 2 by mating or telescoping the first cylinder 1 within the second cylinder 2 which has a relatively large wall thickness and an inner diameter equal to the outer diameter of the first cylinder 1. Within the cylinder 1 is positioned a spring 3a in a transverse plane perpendicular to the longitudinal axis of the cylinder 1 in such a manner that it resiliently presses on the inner wall surface of the cylinder 1. The spring 3a is a wire spring having the configuration of expandable arch. The spring 3a has looped or bent sections or ears 3a' with outwardly converging sides and which project outwardly from both ends of the spring 3a and at any convenient positions therebetween. The ears 3a' pass through corresponding holes 4 in the shape of slots formed in the wall of the first cylinder and the projecting end of each ear or looped sections extends outwardly to some extent from the circumferential surface of the first cylinder 1. Moreover, there are formed tapered surfaces 5 in the inner wall surface of the thick-walled cylinder 2 at positions where the projecting outer end portions of the looped sections or ears 3a' engage the second cylinder 2 during coupling. As the cylinder 1 is inserted in the cylinder 2 to an increasingly deeper position, the tapered surfaces 5 cooperate with the outwardly projected portions of the looped sections and push them into the associating holes 4 formed in the cylinder 1. In the wall of the cylinder 2, there are formed slot shaped holes or cavities 6 at positions adjacent to the inner edge of the tapered surfaces.

The outwardly projecting portions of the ears 3a' formed on the expandable spring 3a are pushed into the wall of the cylinder 1 by means of the tapered surfaces 5 on the cylinder 2 as the lower end of the cylinder 1 is inserted in the cylinder 2 to an increasingly deeper position against the outward bias of spring 3a. When the outwardly projected ends of the ears pass over the inner edge of the tapered surfaces 5 and reach the positions opposite to the through holes or cavities 6 formed in the wall of the cylinder 2, the outwardly projected ends of the looped sections are allowed to enter the through holes or cavities 6 by the expanding force of the spring 3a. Thus the mating cylinders 1 and 2 are firmly coupled together. When it is desired to separate these two cylinders from each other, one of the cylinders is rotated with respect to the other about their common axis. The engaging portions of the looped sections or ears 3a' formed on the spring 3a will then be pushed into the wall of the cylinder 1 against the expanding force of the spring 3a due to the sliding contact with the edge of the through holes or cavities 6, so that these mating cylinders can be pulled away in the opposite directions along the common central axis. Upon separation of these cylinders, the spring 3a restores to the initial position as shown in FIG. 1 due to the expandability of the spring 3a.

Figure 2:
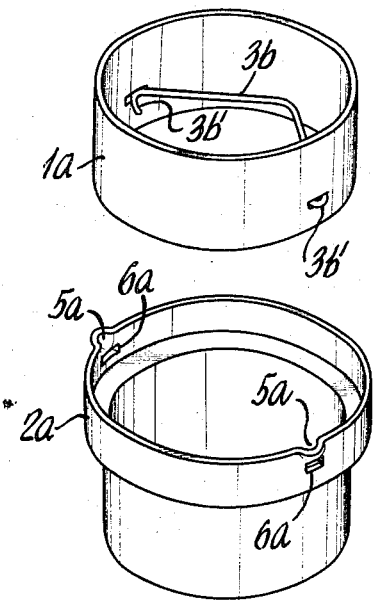
FIG. 2 is a view similar to FIG. 1 of another embodiment of the present invention.

In FIG. 2 there is illustrated another embodiment of the present invention, wherein the outer cylinder is formed of thin plate. In this embodiment, there are formed in the enlarged upper border 2a of the female coupling member outwardly bulging bill-shaped sections 5a having camdefining tapered inner surfaces. Also formed in border 2a are holes 6a at positions adjacent to the inner edge of the tapered surfaces. These tapered surfaces and holes 6a are essentially equivalent to the tapered surfaces 5 formed internally in the thick wall of the cylinder 2 and to the through holes or cavities 6 as shown in FIG. 1. In FIG. 2, the expandable arched spring is positioned in cylinder 1a and is shown as a V-shaped expandable spring 3b having ears or looped sections 3b' at both ends thereof. It will be noted that the expandable spring may include additional ears looped sections other than those formed at both ends thereof.

Figure 3:
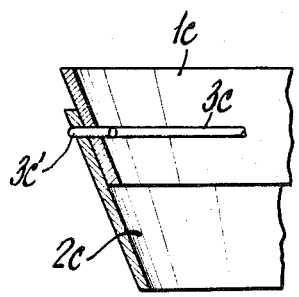
FIG. 3 is a fragmentary longitudinal sectional view of still another embodiment of the present invention shown in which the coupling is shown in a coupled condition.

FIG. 3 shows still another embodiment of the present invention in which the coupling members 1c and 2c are of conical shape. In this case since the conical inner surface of the external cylinder 2c serves to push the looped sections 3c' of the expandable spring 3c into the wall of inner cylinder 1c at the early stage of mating of the two cylinders, there is no need of forming tapered surfaces as described previously in connection with FIGS. 1 and 2 for pushing the ears looped sections inwardly. The inside face of the upper border of female member 2c defines cam faces.

FIG. 4 shows a further embodiment according to the present invention adapted to detachably couple, for example, a dish-like decorative metal cap 7 mounted on top of a hanging pipe 7a of a pendent type lighting fixture with a mounting plate 8 fixedly attached to the ceiling board 9 by means of rivets or the like. The circumferential wall of the dish-like decorative metal cap 7 is shaped conically, and the mounting plate securedly mounted on the ceiling board includes a disk having three integral lugs 8a depending from the periphery thereof. The lugs 8a are so designed that they correspond to a portion of the circumferential wall of a virtual hollow cone which may be established with the mounting plate 8 as its base. The dimensions of the lugs 8a are such that, when the decorative metal cap 7 is mounted coaxially over the mounting plate 8, the lugs 8a can be brought into contact with the inner surface of the conical circumferential wall of the metal cap 7. In each lug 8a there is formed a horizontal slot adapted to receive a corresponding ear or bent loop section of the expandable arched spring 3d in the same manner as described in the previous embodiments. Thus the projected or outer end portions 3d' of the looped sections will slightly extend beyond the lugs. In the conical circumferential wall of the dish-like decorative metal cap 7 are formed horizontal slots 6a, which are adapted to receive the projected end portions of the looped sections when the open end surface of the dish-like decorative metal cap 7 is brought into contact with the ceiling board. It will readily be understood from the above description that the coupling means shown in FIG. 4 substantially corresponds in construction to the embodiment of FIG. 3. Thus in FIG. 4, when the dish-like metal cap 7 is mounted coaxially over the mounting plate 8 secured on the ceiling board, the projected end portions 3d' of the ears or looped sections formed on the spring 3d will enter the corresponding slots 6d formed in the conical circumferential wall of the dish-like metal cap so that the latter can be mounted on the ceiling. It will be understood that the cap 7 can be dismounted from the ceiling board by rotating the same around the central axis thereof.

Although the embodiment of FIG. 4 has been described as a coupling means for mounting a decorative metal cap of a pendent type lighting fixture onto the ceiling board, the structure may be inverted to make a coupling for detachably mounting the dish-like metal cap 7 which is coaxially secured at the bottom of the post 7a onto the floor board by use of a mounting plate having lugs. Of course the conical mating members shown in FIG. 4 may also be made to have right cylindrical configurations as shown in FIG. 1 or 2.

It is known that the mating cylindrical bodies can be held together by means of some knock pins or balls. In such a conventional arrangement, the individual knock pin or ball has to be arranged resiliently in the wall of the cylindrical bodies. This arrangement, therefore, is hardly applicable to the hollow bodies having a small wall thickness, and also the structure of the resulting coupling means becomes disadvantageously complicated. According to the present invention, in place of the knock pins or balls, looped sections or ears are formed on an expandable spring which is extended along the inner surface of one mating cylinder. This arrangement is advantageous especially when some components are to be accommodated within the cylinders, because this arrangement minimally decreases the internal space within the cylinders.

In FIGS. 5 and 6 a coupling according to one embodiment of this invention is shown incorporated in a projector for illuminating a room, stage or display goods. The left half portion 101 defining an outer cylindrical body is open at its rear end (in this description, the left and right ends of the illustrated projector correspond to the rear and front ends thereof, respectively). An end plate 101a having a central light-transmitting opening 102 formed therein is suitably secured in position to the inner front border of the half portion 101. On the end plate 101a are positioned four stay bolts 103 at locations corresponding to the corners of a square the center of which coincides with the center of the end plate. A front end plate of the inner cylinder 104 is arranged coaxially with but spaced from the half portion 101 of the outer cylinder by means of spacer tubes mounted on the stay bolts 103. The front end plate of the inner cylinder has a central light-transmitting opening drilled therein, which is approximately equal to the light-transmitting opening 102 in size and configuration. To the open rear end of the inner cylinder is riveted the peripheral flange of the rear inner cylinder 106 with the circumferential collar of a concave reflecting mirror 105 being sandwiched therebetween. In the rear end plate 106a of the rear inner cylinder 106 and in the reflecting mirror are formed, respectively, central openings for permitting a light source lamp 107 described hereunder to be inserted from the rear side along the main optical axis of the projector.

To the front extensions of the four stay bolts 103 and spaced from front end plate 101a by spacer tubes mounted around the stay bolts is fastened with associated nuts the rear end flange of a cylinder 109 for slideably guiding a lens holding sleeve 108. Since a headed screw 110 screwed into the lens holding sleeve 108 which is inserted in the guide cylinder 109 is slideable along the axially extending slot 109a formed in the guide cylinder 109, the lens holding sleeve 108 and the guide cylinder 109 can be locked together at any desired relative position along the common axis thereof.

Between the front end plate 101a of the outer cylinder 1 and the rear end of the cylinder 109 for guiding the lens holding sleeve 108 extend a pair of leaf springs 123 at both sides of the light-transmitting opening 102. If desired, for adjusting the light to be projected a mask plate 112 having a central opening 111 may be secured between the leaf spring 123 and the front surface of the end plate 101a. The outer cylinder 113 shown in the right portion of FIG. 5 is releasably mounted around the outer peripheral surface of the bent portion formed on the front end plate 101a so that the rear front outer cylinders 101 and 113 form a detachably coupled single cylindrical body having a common axis by means of a releasable coupling of the construction shown in FIG. 3 in which the front end section of portion 101 is conical and nests in the conical end section of portion 113 and the looped sections 3c' of a curved wire spring located in portion 101 projects through slots in portion 101 and releasably engage aligned slots in portion 113. The rear outer cylinder 101 is kept in association with a suitable base (not shown) by means of some universal joint so that the axis of light to be projected can be directed in any desired direction and, if desired, said universal joint can be locked once the direction of the light being projected has been decided.

On the rear end portion of the inner cylinder 106 is disengageably mounted a cup-shaped body 114 at its open peripheral edge, the cup-shaped body 114 being adapted to hold therein a light source lamp. A disk-shaped metallic washer 115 is coaxially arranged on the rear end of a socket 107a (see FIG. 6) adapted to receive the light source lamp 107 and, by riveting the washer 115 with the bent end portions of the metallic strip 116 attached on the socket, the washer 115 and the socket 107a are coupled together and form an integral unit. Additionally, a screw 118 is inserted in the central hole drilled in the washer 115 from the right hand side in the plane of FIG. 6. At a time when the countersunk head of the screw 118 is received in the counter sink of the central hole, the circumferential area and the countersunk head of the screw 118 are soldered together so that the screw 118 forms an integral extension of the axis of the socket 107a. The screw 118 also extends loosely through the central hole formed in a ring 119 formed of a phosphor bronze plate. The ring 119 has several integral leaf springs 119a extending outwardly in various directions from the ring 119. These leaf springs 119a are all curved towards the washer 115 in such a manner that each end thereof can be inserted in and secured by an associated slot 115a in the washer 115. The peripheral notches 115b, which are formed in the washer 115 at positions adjacent to respective slots 115a, provide the leaf springs 119a with clearances when the leaf springs 119a are bent sufficiently as shown in FIG. 5. One or more of the leaf springs 119a are shaped to have a gentler curve than the other leaf springs 119a as shown at 119b. By engaging a notch 119b' formed on the free end of leaf spring 119b with a projection 114a formed on the inner wall surface of the cup-shaped body 114 at a suitable position, the springs 119a press the ring 119 towards the bottom of the cup-shaped body 114. A disk 120 is arranged coaxially between the ring 119 and the bottom plate of the cup-shaped body 114. At the center of the disk 120 is formed a cone-shaped counter sink 120a of which circumferential surface is soldered with the outer peripheral surface of the inner end (right end as seen in the drawing) of a bushing 120b inserted in the central sink 120a from the left hand side as seen in FIG. 6, so that the bushing 120b and the disk 120 form substantially an integral unit. The bushing 120b extends loosely through the central hole formed in the bottom plate of the cup-shaped body 114 as shown in FIG. 5. Within the bushing 120b is loosely inserted the screw 118 and on the leading end of the screw 118 is mounted an adjusting nut 121. A pair of holes are drilled in the bottom of the cup-shaped body 114 at an equal distance from the center of the bottom of the cup-shaped body along the two radii which intersect each other at right angles. There are inserted in these holes a pair of headed screws 122 from the left hand side as seen in FIG. 5, the leading ends of the screws 122 being screwed in the corresponding eccentric threaded holes 122a formed in the disk 120. These two eccentric threaded holes 122a, also, are located along two radii which intersect each other at right angles at the center of the disk 120. On the periphery of the disk 120 are formed notches 120c, which provide the leaf springs 119a with clearances as in the same manner as the notches 115b formed in the washer 115 and serve to prevent the relative rotation between the ring 119 and the disk 120.

As the structure for supporting the light source lamp within the cup-shaped body 114 is as above, the light source lamp 107, socket 107a, washer 115, and screw 118 form substantially a single integral body which is biased rightwards in the plane of FIG. 5 by the resilient force of the leaf springs 119a. On the other hand, the truncated cone formed on the disk 120 which is integrally connected with the bushing 120b is pressed by leaf springs 119b against the inner surface of the bottom plate of the cup-shaped body 114. Therefore if nut 121 shown in the left end portion of FIG. 5 is screwed in, the light source lamp 107 will be retreated along the main optical axis against the forward biasing force of the leaf springs 119a. On the contrary, if the nut is screwed out, the light source lamp 107 will be advanced by the biasing force of the leaf springs 119a. In addition, when either one of the two screws 122 of which heads are exposed outside the bottom plate of the cup-shaped body 114 is tightened, the screw 118 which is coupled integrally with the light source lamp will be tilted about the truncated cone formed on the disk 120 towards the screw 122 which has been tightened. As mentioned above, each of the two screws 122 is disposed on either one of the two radii which intersect each other at right angles at the center of the base plate of the cup-shaped body 114, the light source lamp can be tilted, by tightening or loosening either one of the screws 122, in both the vertical and horizontal planes and furthermore, by appropriately tightening or loosening both the screws 122, to any intermediate directions between the vertical and horizontal planes.

The lamp assembly is mounted to a female coupling member 137, of similar construction to that shown in FIG. 4, by means of a post 137*a* coaxial with coupling member 137 and having one end secured to the horizontal plate of coupling member 137 and its other end suitably connected to the forward border of shell 101. Like the female coupling member shown in FIG. 4, the coupling member includes a conical peripheral wall which is beaded along its edge as at 138 and has formed therein a plurality of circumferentially spaced horizontal slots 133*d'* corresponding to slots 6*d*. In other respects the coupling member 137 is similar to that shown in FIG. 4 and may be employed with a mating male coupling member, like that shown in FIG. 4, which is provided with an associated wire spring having outwardly directed ears, or like that shown in FIG. 3.

While there have been described and illustrated preferred embodiments of the present invention, it is apparent that numerous alterations, omissions and additions may be made without departing from the spirit thereof.

I claim:

1. A separable coupling comprising a female coupling member including a circular first peripheral wall having a plurality of circumferentially spaced recesses accessible at the inner face of said peripheral wall and cam defining faces tapered radially outwardly in a direction toward the outer edge of said wall, a male coupling member having a circular second peripheral wall at least partially rotatably telescoping with said first peripheral wall and having peripherally spaced openings registering with said corresponding recesses in said first peripheral wall, and an elongated resilient wire member disposed in said male coupling member and having outwardly directed ears with outwardly converging side arms, resiliently biased outwardly under the influence of said resilient wire member through said respective openings and into engagement with said recesses when said coupling members are in coupled condition, the radial distance between the outer edges of said ears and the longitudinal axis of said male coupling member when said ears are fully extended being less than the radial distance between the outer edges of said cam faces and the longitudinal axis of said female coupling member and greater than the radial distance between said recesses and said longitudinal axis.

2. The separable coupling of claim 1 wherein said peripheral faces extend continuously about the peripheries of said coupling members.

3. The separable coupling of claim 1 wherein said recesses and openings are defined by circumferentially extending slots.

4. The separable coupling of claim 1 wherein said peripheral walls are cylindrical.

* * * * *